No. 668,066. Patented Feb. 12, 1901.
W. A. STRONG.
FISH HOOK.
(Application filed Jan. 23, 1900.)

(No Model.)

Fig. 8.

Witnesses
F. O. Alden.
Chas. S. Hyer.

William A. Strong, Inventor
By his Attorneys,
C. A. Snow & Co.

THE NORRIS PETERS CO., PHOTO-LITHO., WASHINGTON, D. C.

UNITED STATES PATENT OFFICE.

WILLIAM A. STRONG, OF VICKSBURG, MICHIGAN.

FISH-HOOK.

SPECIFICATION forming part of Letters Patent No. 668,066, dated February 12, 1901.

Application filed January 23, 1900. Serial No. 2,525. (No model.)

*To all whom it may concern:*

Be it known that I, WILLIAM A. STRONG, a citizen of the United States, residing at Vicksburg, in the county of Kalamazoo and State of Michigan, have invented a new and useful Fish-Hook, of which the following is a specification.

This invention relates to fish-hooks; and the objects in view are, first, to provide a guard in connection with a hook to prevent it from becoming entangled in weeds or other like substances when trolling, casting, or otherwise using the hook and which is of sufficient sensitive resilient nature to be easily moved by the fish when attacking the bait and also permitting the hook to be carried over or across or through weeds without engaging it therewith by reason of the flexibility of the guard, and, secondly, to provide a reflector in connection with the shank of the hook of a particular form and having a highly-polished surface or a reflecting-plating, so as to produce an attractive feature and entice the fish, the said reflector also being of such shape as to avoid entanglement thereof with weeds or other substances and having a filling to weight the same and serving to maintain the bait in an upright position whether dead or alive, as well as simulating the body of a minnow, and effectively guides the hook in its movement through the water.

With these and other objects and advantages in view the invention consists in the construction and arrangement of the several parts, which will be more fully hereinafter described and claimed.

Figure 1:
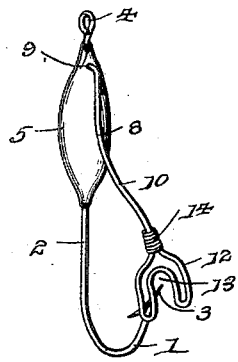
Figure 2:
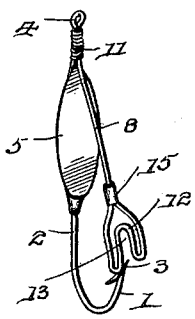
Figure 3:
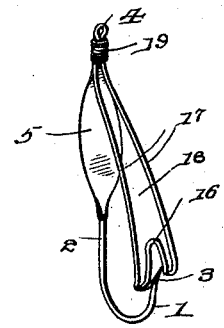
Figure 4:
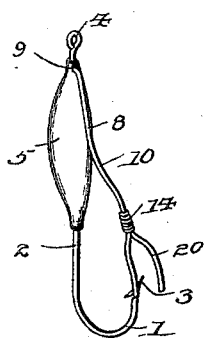
Figure 5:
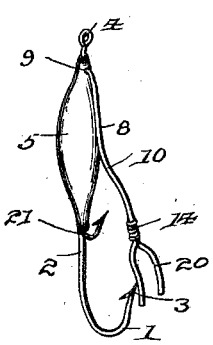
Figure 6:
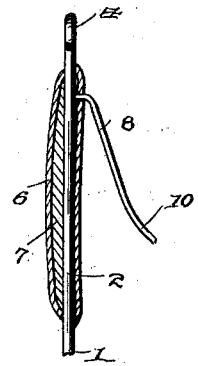
Figure 7:
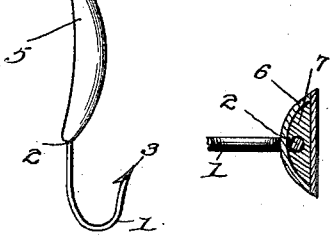

In the drawings, Figure 1 is a perspective view of a hook, showing the improved devices applied thereto, the guard having an enlarged double terminal construction and the reflector shown with its convex side adjacent the arm of the guard. Fig. 2 is a view similar to Fig. 1, showing the guard of smaller dimension, but of the same shape, and the reflector with its flat face nearest the arm of the guard. Fig. 3 is a similar view of the improved device, showing a different form of guard, the reflector being arranged as illustrated by Fig. 2. Fig. 4 is a similar view showing the reflector in the position illustrated in Fig. 1 and the guard of single-forked form. Fig. 5 is a similar view showing a guard constructed like that illustrated by Fig. 4, but of less dimension, and the reflector provided with a lower auxiliary bait-holding hook. Fig. 6 is a transverse vertical section through the reflector, showing the construction of the same and illustrating a part of the hook-shank in connection therewith and also a portion of the guard-arm. Fig. 7 is a side elevation view of a hook, showing the reflector on the shank thereof adapted for use without the guard. Fig. 8 is a horizontal section taken through the center of one of the reflectors and shown on a large scale.

Similar numerals of reference are employed to indicate corresponding parts in the several views.

The numeral 1 in all the figures designates a hook of any suitable dimension or form and comprising a shank 2 and a barbed or bearded end 3 of the usual construction. The upper extremity of the shank 2 is formed with an eye 4, as shown, for the purpose of attachment to a leader, snood, or the line direct and according as necessities may require.

The simplest form of attachment to the hook and beneficially adding to the effectiveness thereof is particularly illustrated by Fig. 7 and consists of a reflector 5, which is intended to be used alone without the additional attachment that will be hereinafter described. The said reflector is also shown in different positions in several of the preceding figures of the drawings for the purpose of demonstrating that it will serve its function equally well when disposed in a variety of ways. This reflector consists, essentially, of an outer covering or sheathing 6, of copper, which is used in preference to any other material in view of its non-corrosive nature and which is also capable of receiving a very high polish, to thereby form a reflecting-surface, which is one of the salient advantages of this attachment. This reflector, as more clearly shown by Fig. 8, is of plano-convex form and bowed longitudinally, the opposite extremities gradually tapering and closely merging into the shank 2 of the hook 1. The convex face of the reflector may be disposed toward the front of the hook, as shown by Figs. 1, 4, and 5, or the flat or plain face may be so disposed, as shown by Figs. 2, 3, 6, and 7. The plain or flat face of the reflector when disposed toward the rear will produce a runner for the hook under ordinary conditions until the balance is overcome and a lateral tilting ensues, when the rounded side, together with the then lowermost reduced edge, will immediately set up a spinning or whirling action, and the same operation will ensue when the rounded or convex face of the reflector is toward the rear. When the flat face of the reflector is located toward the front of the hook, the bait can be more conveniently applied or an accommodation will ensue from such position of the reflector for the application of certain kinds of bait. The polished surface of the sheathing or covering 6 can be seen in the water from a considerable distance and will be attractive and entice the fish to move toward or attack the bait. If desired, the sheathing or covering 6 may be plated with gold, silver, or other metal, and to weight the reflector it is filled with soft solder, as at 7, and by this means also it is secured to the shank 2 of the hook. The shape of the reflector is such that it will be maintained in an upright position, and so hold the bait whether dead or alive, with obvious advantages. The shape of the reflector also affords means for permitting it to be easily drawn over or across weeds or through the latter without catching.

As an effective attachment to the hook and in combination with the reflector set forth different forms of guards are to be used, and referring now more particularly to Figs. 1 and 2, said guards comprise in each instance an arm 8, which is fastened at its upper extremity 9 in a portion of the reflector, and, as shown by Fig. 1, it is preferable that the said arm be provided with an intermediate bend 10 to give it greater spring action. The arm 8 (shown by Fig. 2) does not have the intermediate bend 10 and is fastened at its upper extremity by a coiled wrapping 11, of suitable wire. On the lower extremities of the arms 8 guards 12 are secured in each instance, the guard 12 shown by Fig. 1 being of greater width or generally of larger dimensions than the guard 12 shown by Fig. 2. Both of the guards shown by Figs. 1 and 2, however, are of doubled U-shaped form to produce a central arch 13 to freely move over the barbed or bearded end 3 of the hook 1 and formed of a single piece of wire having its two extremities drawn closely together against the lower terminal of the arm 8, and in Fig. 1 said extremities are secured by a wrapping 14, of wire, but, as shown in Fig. 2, may be soldered, as at 15. In Fig. 3 the guard comprises a single U-shaped bend or arch 16, which is integrally formed with the opposite members 17 of a double support 18, said members converging toward the eye 4 at the upper end of the shank 2 above the reflector 5 and secured by a winding 19, of wire or other suitable material.

In Figs. 4 and 5 the guards 20 are of single-fork form, standing in the same normal relation to the barbed or bearded ends 3 of the hook 1, and produce arches which can be easily pushed inwardly toward the shank 2 of the hook. The forks 20 are longitudinally curved to bring their lower extremities inwardly on opposite sides of the said barbed or bearded end of the hook and have their upper extremities secured to arms 8, similar in all respects to those shown by Fig. 1, the means of securing the said forks in each instance being in the form of a winding 14, similar to that shown by Fig. 1. The arms 8 (shown by Figs. 4 and 5) also have the intermediate inward bends 10 to make them assume their normal positions with greater surety after operation, and the only difference between the guards shown by Figs. 4 and 5 is that that illustrated by Fig. 4 is of greater dimensions than that shown by Fig. 5.

In Fig. 5 an additional feature is shown in the form of an auxiliary bait-holding hook 21, which is adapted to be used with any of the devices shown and connected to the lower extremity of the reflector 5 and will be effectual in holding large bait regularly up in position—such, for instance, as a frog—and in the application of this kind of bait the hook 21 will be slipped through the center of the lips or, as commonly known, the "nose" of a frog and will be disposed in an attractive position. This auxiliary hook also permits the use of lifeless bait and disposes the latter in a position having the appearance similar to that assumed by live bait.

The guard in either form can be easily moved inwardly toward the shank 2 by the fish, and thereby clear the barbed or bearded end 3 of the hook 1 to perform its usual function. It will be observed, however, that the opposite portions of the guard project over the sides of the said barbed or bearded end of the hook and that movement in this direction cannot be effected and the fish in making the attack is compelled to approach directly at the front. This, however, will be regulated by the strength of the resilient material of which the guard and its arm is composed and also the force used by the fish in approaching the bait. The guard also effectually serves to hold the bait in place and prevents waste of the same.

Many other advantages will become apparent to those using the improved form of hook, and it is obviously apparent that changes in the form, proportions, and minor details may be resorted to without departing from the principle or sacrificing any of the advantages of the invention.

Having thus described the invention, what is claimed as new is—

1. The combination with a fish-hook, of a reflector rigidly fixed to the shank thereof and comprising a covering or sheathing and a filling of weighting material, the latter material serving to secure the shank of the hook in the reflector, the latter having continuous smooth plano-convex reflecting-faces and bowed longitudinally and gradually tapered from an enlarged or thick central or intermediate portion toward opposite ends.

2. The combination with a fish-hook, of a weighted reflector mounted on and completely inclosing the portion of the hook-shank over which it extends, the said reflector having opposite continuous and smooth plano-convex reflecting-faces bowed longitudinally and gradually tapered from an enlarged or thickened central or intermediate portion toward the opposite ends.

3. The combination with a fish-hook, of a reflector fixed on the shank and comprising a covering or sheathing and a filling of weighting material, the latter material serving to secure the shank of the hook in the reflector.

4. A guard for a spoon-hook consisting of a resilient support attached at its upper extremity to a portion of the shank of the hook and depending from the latter at an outward angle of inclination, the lower extremity of the support being provided with a U-shaped arch or yoke distinct from the contour of the support and which stands clear of and over the bearded end of the hook and including in its structure bent portions projected equally in opposite lateral directions, the lower terminals of the arch or yoke being unconnected and the upper reduced portion always out of contact with the said hook end.

5. A guard for a spoon-hook consisting of a single resilient wire arm connected at its upper extremity thereto and projecting downwardly at an angle of inclination, and having a U-shaped arch or yoke on its lower extremity with equal laterally-projected bent portions which are normally in advance of and free to move over the bearded end of the hook.

In testimony that I claim the foregoing as my own I have hereto affixed my signature in the presence of two witnesses.

WILLIAM A. STRONG.

Witnesses:
 JESSE R. CROPSEY,
 WILLIAM F. NOTLEY.